United States Patent
Connelly

(10) Patent No.: US 7,373,402 B2
(45) Date of Patent: May 13, 2008

(54) METHOD, APPARATUS, AND MACHINE-READABLE MEDIUM FOR CONFIGURING THRESHOLDS ON HETEROGENEOUS NETWORK ELEMENTS

(75) Inventor: Stephen P. Connelly, Campbell, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 715 days.

(21) Appl. No.: 10/222,796

(22) Filed: Aug. 19, 2002

(65) Prior Publication Data
US 2004/0034704 A1    Feb. 19, 2004

(51) Int. Cl.
*G06F 15/173* (2006.01)

(52) U.S. Cl. .................. 709/224; 709/220; 709/223; 709/224

(58) Field of Classification Search ............ 709/220, 709/223, 224
See application file for complete search history.

(56) References Cited

U.S. PATENT DOCUMENTS

| | | | |
|---|---|---|---|
| 5,751,964 A * | 5/1998 | Ordanic et al. ............ 709/224 |
| 5,913,036 A * | 6/1999 | Brownmiller et al. ...... 709/224 |
| 6,182,022 B1 * | 1/2001 | Mayle et al. ............... 702/182 |
| 6,633,230 B2 * | 10/2003 | Grandin et al. ............ 370/252 |
| 6,704,284 B1 * | 3/2004 | Stevenson et al. .......... 709/224 |
| 6,810,367 B2 * | 10/2004 | Barnard ..................... 709/224 |
| 7,050,931 B2 * | 5/2006 | Conrad ...................... 702/177 |
| 2003/0126254 A1 * | 7/2003 | Cruickshank et al. ...... 709/224 |

* cited by examiner

*Primary Examiner*—Ario Etienne
*Assistant Examiner*—Ramy M Osman

(57) ABSTRACT

A system is disclosed that automatically translates a threshold into a raw threshold value, and, when a data violation is generated when the raw threshold value is violated based on a measured data value generated by one of a plurality of heterogeneous network elements, automatically translates the data violation into a threshold violation. In an embodiment, the system automatically monitors the selected heterogeneous network element for the measured data value. In an embodiment, the system selects one of the plurality of heterogeneous network elements, and automatically configures the threshold. In an embodiment, the system automatically accesses information regarding the selected heterogeneous network element from a database. In an embodiment, the system automatically distributes the threshold violation. In an embodiment, the system automatically publishes the threshold violation to a publish/subscribe system, and automatically makes the published threshold violation available to a subscriber.

21 Claims, 5 Drawing Sheets

METHOD, APPARATUS, AND MACHINE-READABLE MEDIUM FOR CONFIGURING THRESHOLDS ON HETEROGENEOUS NETWORK ELEMENTS

BACKGROUND OF THE INVENTION

1. Field of the Invention

The present invention relates to generating threshold events from heterogeneous network elements on a network.

2. Description of the Related Art

Network administrators receive a large amount of information while monitoring a network. Frequently, the network administrators are only concerned with being notified of problems with the network, for example, when network utilization exceeds 60 percent. To accomplish this, the network administrators have a threshold in mind, e.g., 60 percent utilization, and need to program a system to monitor for such utilization.

Previously, network administrators had to individually program data monitors to monitor individual network elements by entering a raw threshold value that is recognized by the network element and the data monitor. For example, in an Ethernet network that runs at 10 megabits per second, 6 megabits per second is 60 percent utilization, and the network administrator would previously have to individually program the data monitor to monitor the network element for situations where utilization exceeded 6 megabits per second. This involves manual calculations on the part of the network administrator.

Individually, this is not a daunting task. However, when a network administrator is faced with a plurality of heterogeneous network elements, programming a plurality of data monitors to monitor a plurality of heterogeneous network elements is very time consuming. In addition, user error may be introduced if the network administrator erroneously performs the calculation of the raw threshold value, as the network administrator must be knowledgeable of the underlying hardware architecture of the network and network element to be monitored.

Further, the network administrators had to wait for the data monitors to output a measurement after a predetermined interval, preventing the network administrator from knowing about a threshold violation until the expiration of the interval. If the interval was set, for example, at 10 minutes, and the threshold violation occurred one minute into the interval, the network administrator would not be notified of the threshold violation until the expiration of the interval, i.e., nine minutes later.

Therefore, a system whereby a network administrator can enter a threshold, have the threshold translated into a raw threshold value regardless of the data monitors and heterogeneous network elements involved, have the data monitors monitor the heterogeneous network elements for violations of the raw threshold value, have the violations translated back into a user-friendly format, and have the network administrator notified of the translated violations as they occur is needed.

SUMMARY OF THE INVENTION

The present invention provides a method, apparatus, and machine-readable medium to design system thresholds, to configure a plurality of heterogeneous network elements, and to notify a network administrator of threshold events.

The present invention provides a system that automatically translates a threshold into a raw threshold value, and, when a data violation is generated when the raw threshold value is violated based on a measured data value generated by one of a plurality of heterogeneous network elements, automatically translates the data violation into a threshold violation. In an embodiment, the system automatically monitors the selected heterogeneous network element for the measured data value. In an embodiment, the system selects one of the plurality of heterogeneous network elements, and automatically configures the threshold. In an embodiment, the system automatically accesses information regarding the selected heterogeneous network element from a database. In an embodiment, the system automatically distributes the threshold violation. In an embodiment, the system automatically publishes the threshold violation to a publish/subscribe system, and automatically makes the published threshold violation available to a subscriber.

The present invention provides a system that includes a plurality of heterogeneous network elements to generate measured data values, and a threshold translation engine to translate a threshold into a raw threshold value and to translate a data violation into a threshold violation, wherein the data violation is generated when the raw threshold value is violated based on the measured data values. In an embodiment, the system includes a threshold configurator to configure the threshold. In an embodiment, the system includes a network element database to store threshold configuration information about the plurality of heterogeneous network elements. In an embodiment, the system includes a plurality of absolute data monitors to monitor the plurality of heterogeneous network elements for the measured data values and to generate the data violation. In an embodiment, the system includes a raw data configurator to configure the plurality of absolute data monitors to monitor the plurality of heterogeneous network elements. In an embodiment, the system includes a publish/subscribe system to publish the threshold violation and to make the published threshold violation available to a subscriber. In an embodiment, the system includes a subscriber, wherein the subscriber is an event viewer, an event policy system, a data collection system, or an external system.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

These and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
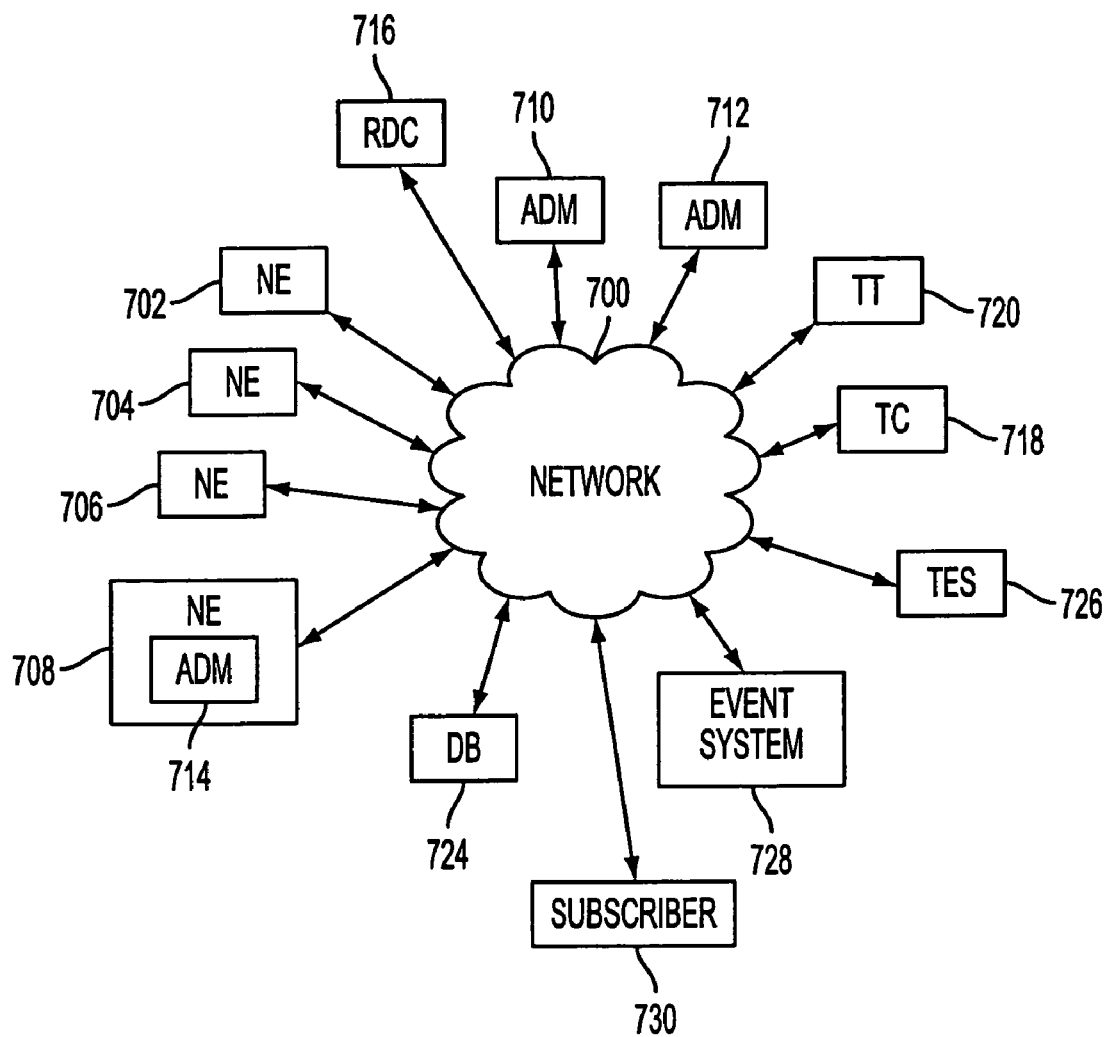
FIG. 1 is a diagram illustrating a network connected to a plurality of network elements, a database, a subscriber, and event system, a threshold event sender, a threshold configurator, a threshold translator, a plurality of absolute data monitors, and a raw data configurator, according to embodiments of the present invention.

Reference will now be made in detail to the present preferred embodiments of the present invention, examples of which are illustrated in the accompanying drawings, wherein like reference numerals refer to like elements throughout.

Network elements may be controlled via different protocols, e.g., SNMP, XML, CMIP, http, Corba, IEEE-488, IDL, TL1, SCPI, ASCII, etc. The term "heterogeneous" is defined as "different in kind; unlike; incongruous." Random House Webster's Unabridged Dictionary 897 ($2^{nd}$ ed. 1998). A plurality of network elements in a network may be heterogeneous as to the type of protocols through which they are controlled. The present invention allows network administrators to set a threshold for a plurality of heterogeneous network elements, and the system notifies the network administrator when the threshold is violated. However, the present invention is not limited to network administrators, as any end-user desiring to set thresholds may use the present invention.

FIG. 1 is a diagram illustrating a network connected to a plurality of network elements, a database, a subscriber, and event system, a threshold event sender, a threshold configurator, a threshold translator, a plurality of absolute data monitors, and a raw data configurator, according to embodiments of the present invention. Referring now to FIG. 1, network 700 may be any type of network, e.g., a LAN, WAN, switched, unswitched, ATM, ISDN, wireless, the Internet, etc. However, embodiments of the present invention are not limited thereto. For example, network 700 could be a switching mesh that directly connects connected devices. Heterogeneous network elements (each, an "NE") 702, 704, 706, and 708 are connected to network 700. For purposes of illustration, only four network elements are shown; however, embodiments of the present invention are not so limited. For example, there may be greater or fewer than four NEs connected to network 700. NEs 702-708 are controlled via a plurality of protocols, e.g., SNMP, XML, CMIP, etc. NEs 702-708 generate measured data values based on network data. For example, in an embodiment, NEs 702-708 generate measured data values corresponding to utilization, e.g., megabits per second. However, embodiments of the present invention are not limited to utilization, as any other network information may be measured. Also, embodiments of the present invention are not limited to all of the NEs generating the same type of data, e.g., one NE generates data values corresponding to utilization, while another NE generates data values corresponding to speed.

Database ("DB") 724 is connected to network 700, and it stores configuration information about the NEs. In an embodiment, the configuration information comprises an IP address, password, etc. However, embodiments of the present invention are not so limited as the configuration information can comprise any number of things. Threshold configurator ("TC") 718 is connected to network 700, and it presents a user interface to the network administrator for entering a threshold and selecting network elements. The threshold is in a format understandable by the network administrator. For example, in an embodiment, a network administrator desires a 60 percent utilization threshold on one of the NEs that is a network probe. In such an embodiment, TC 718 selects one of the plurality of NEs that is a network probe, e.g., NE 702, and automatically configures the threshold at 60 percent based on the configuration information for NE 702 stored in DB 724. In another embodiment, the network administrator desires a 60 percent utilization threshold on one of the NEs that is a network probe, but only if the threshold is violated for at least 5 seconds. However, embodiments of the present invention are not limited to utilization or network probes, as the network administrator may enter a threshold corresponding to any network information and any NE. For example, the network administrator may set a threshold at 90 percent of the optimal speed on one of the NEs that monitors network speed. In an embodiment, TC 718 is a graphic user interface ("GUI"). For example, TC 718 can comprise a cellular phone with wireless data transfer capability, a personal data assistant ("PDA") with wireless data transfer capability, a personal computer (laptop, desktop, workstation, notepad, wearable, etc.), or a mainframe computer. However, embodiments of the present invention are not limited to GUIs, as any type of user interface may be used. In an embodiment, TC 718 is not included in the system, as the thresholds are automatically set based on a network administrator's pattern of setting the same threshold.

Because the NEs only measure data values and do not understand the threshold, translation is required into a format understandable by the NEs. Threshold translator ("TT") 720 is connected to TC 718 via network 700, and it automatically translates the threshold into a raw threshold value. For example, in the embodiment discussed above in regard to a 60 percent utilization threshold, if the particular NE is capable of 100 megabits per second (based on the configuration information for that NE), the raw threshold value would be 60 megabits per second. TT 720 also translates a data violation into a threshold violation (data violations and threshold violations discussed in more detail below). The translations are accomplished through the use of an algorithm, however one specific algorithm is not used exclusively, as the present invention is not limited to converting from a specific threshold format to a specific raw threshold value format. Because the NEs are heterogeneous, many different algorithms are possible.

Absolute data monitors ("ADMs") 710 and 712 are connected to NEs 702-708 and TT 720 via network 700 and ADM 714 is included within NE 708. ADMs 710-714 are data monitors that monitor the NEs for violations of the threshold. Raw data configurator ("RDC") 716 is connected to network 700, and it configures an ADM to monitor a NE based on the configuration information. After being configured to monitor a particular NE, an ADM, e.g., ADM 712 monitors the measured data values generated by the NE for violation of the raw threshold value. For example, in the embodiment discussed above in regard to a raw threshold value of 60 megabits per second, ADMs 710-714 monitor for a number of packets per second at or greater than 60 megabits per second. If such a situation occurs, the ADM detecting the violation of the raw threshold value generates a data violation to indicate that the raw threshold value has been violated. In the embodiment discussed above in regard to a raw threshold value of 60 megabits per second for at least 5 seconds, ADMs 710-714 monitor the number of packets per second at or greater than 60 megabits per second, and generates a data violation if the number of packets is greater than 60 megabits per second for at least 5 seconds. The generation of data violations is not dependent upon any specific time intervals, e.g., generating and reporting data violations every 10 minutes, as the ADMs generate data violations as soon as they are detected. Therefore, the present invention is advantageous in that it does not wait before notifying the network administrator. In an embodiment, the data violations are transmitted, for example, in packet form, and contain the time sent, the value of the data violation, the IP address of the NE, etc. However, embodiments of the present invention are not so limited, as any suitable form for transmission may be used, and any amount of information may be contained in the transmission.

In an embodiment, an ADM is included within a NE (illustrated in FIG. 1 by ADM 714 and NE 708), where ADM 714 does not need to be configured for NE 708, where ADM 714 monitors only NE 708. The present invention provides ADMs that are not included within the NEs to allow for compatibility with preexisting systems that may or may not contain NEs with resident ADMs. In an embodiment, another ADM, e.g., ADM 710, is configured to monitor NE 708 in addition to ADM 714, when ADM 714 is not capable of monitoring for the desired raw threshold value. For example, in the embodiment discussed above in regard to the 60 megabits per second raw threshold value for at least 5 seconds, ADM 714 may be capable of monitoring the bits per second of NE 708, but may not be capable of monitoring for 5 seconds' worth of a particular number of bits per second. In such an instance, another ADM is configured accordingly. Although the present invention is illustrated with three ADMs, one ADM being included within a NE, embodiments of the present invention are not so limited, as a greater or lesser number of ADMs may exist, a greater or lesser number of ADMs may be included within NEs, all or none of the ADMs may be included within NEs, etc. Embodiments of the present invention are not limited to a particular number of ADMs monitoring a particular number of NEs, as any number of ADMs 710-712 may monitor any number of NEs 702-708.

Because data violations are in a raw threshold format, e.g., 65 megabits per second in the example discussed above, they need to be translated into the format specified by the network administrator. As mentioned above, TT 720 translates data violations into threshold violations. In the example discussed above, TT 720 translates a 10,500 packets per second data violation into a threshold violation of 65 percent. Threshold event sender ("TES") 726 is connected to TT 720 via network 700, and it pushes the threshold violation out.

Event system 728 is connected to TES 726 via network 700, and it distributes the threshold violations as they occur by publishing them for access by subscribers. Subscriber 730 is connected to event system 728 via network 700, and it notifies the network administrator and other interested entities of the threshold violation. The present invention is not limited to one subscriber, as a greater number of subscribers may be connected, or none at all. In an embodiment, subscriber 730 is an event viewer. However, embodiments of the present invention are not so limited. For example, in another embodiment, subscriber 730 is an event policy system. In a further embodiment, subscriber 730 is an external system.

Figure 2:
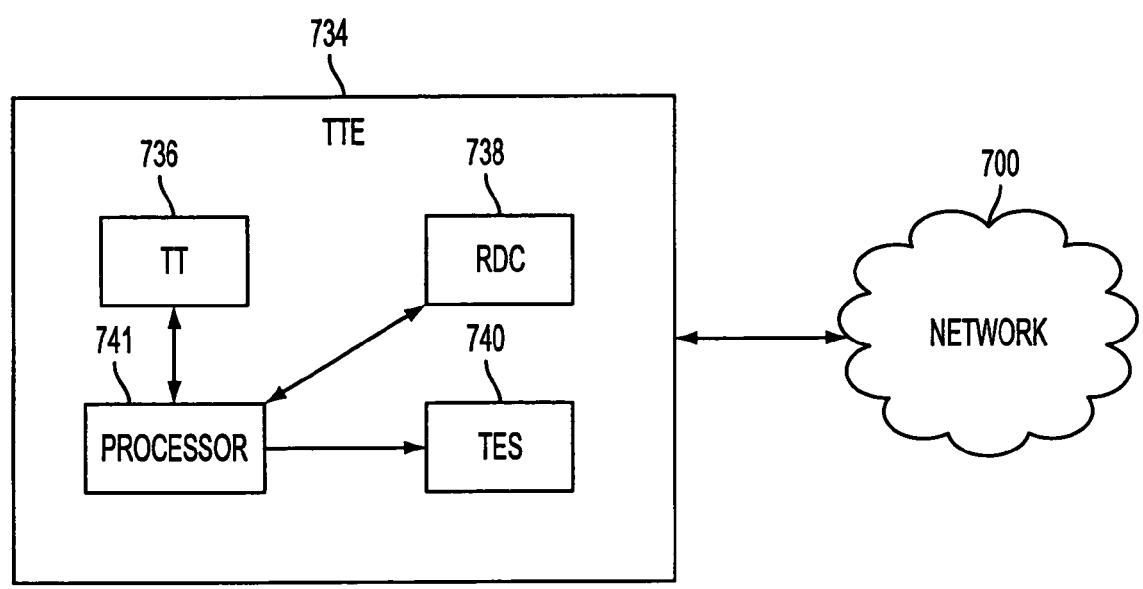
FIG. 2 is a diagram illustrating a threshold translation engine, which is connected to the network, that includes a threshold translator, a raw data configurator, and a threshold event sender, according to embodiments of the present invention.

FIG. 2 is a diagram illustrating a threshold translation engine, which is connected to the network, that includes a threshold translator, a raw data configurator, and a threshold event sender, according to embodiments of the present invention. Referring now to FIG. 2, threshold translation engine ("TTE") 734 is connected to network 700. In an embodiment, TTE 734 includes TT 736, RDC 738, TES 740, and processor 741. TT 736, RDC 738, and TES 740 have the same characteristics as TT 720, RDC 716, and TES 726 in FIG. 1, respectively. In such an embodiment, TT 720, RDC 716, and TES 726 would not be necessary. However, embodiments of the present invention are not so limited, as TT 720, RDC 716, and TES 726 may still exist outside of TTE 734.

Figure 3:
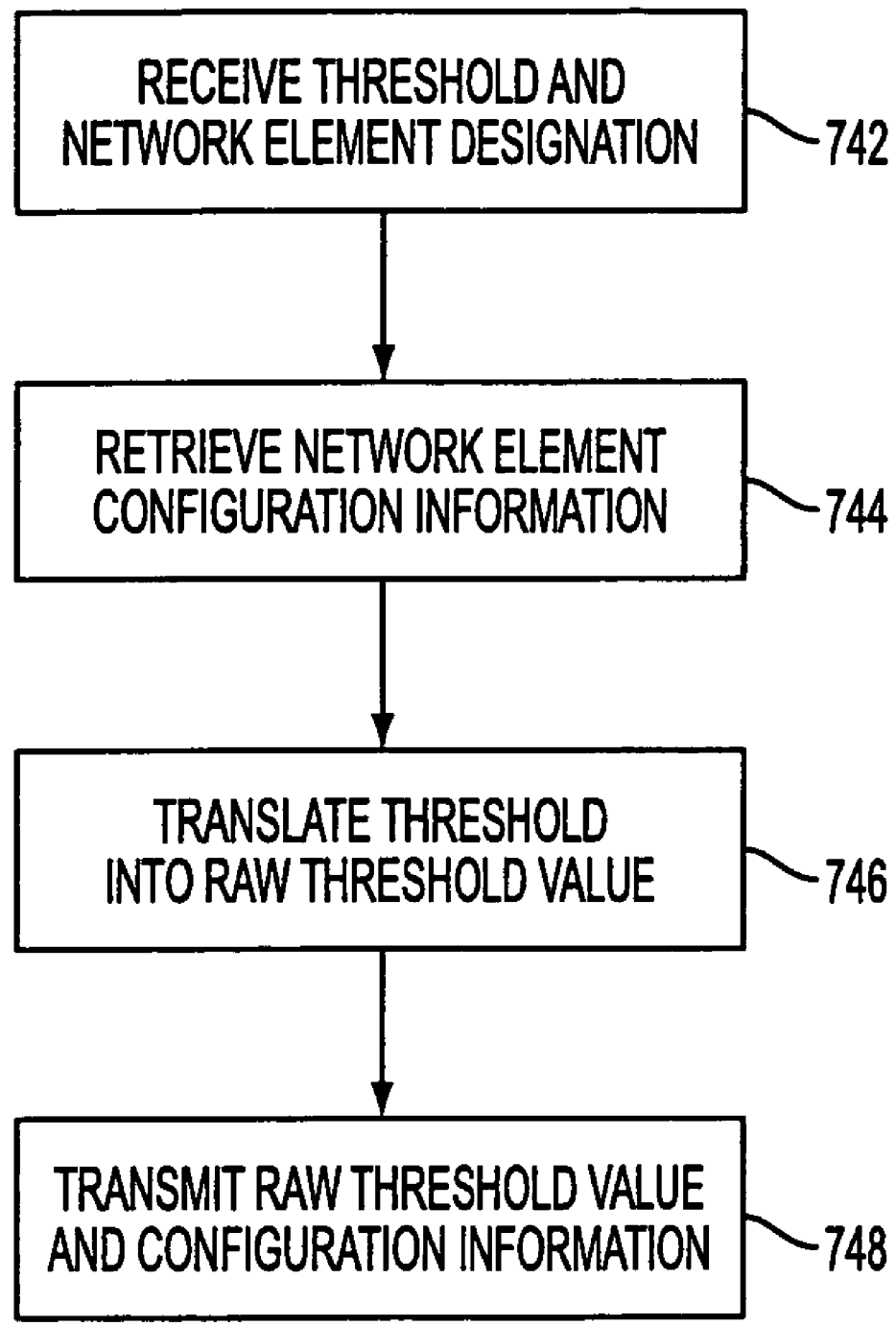
FIG. 3 is a flow diagram illustrating the translation of a threshold into a raw threshold value, according to embodiments of the present invention.

FIG. 3 is a flow diagram illustrating the translation of a threshold into a raw threshold value, according to embodiments of the present invention. Referring now to FIG. 3, a threshold and network element designation is received, in operation 742. From operation 742, the process moves to operation 744, where configuration information regarding the network element is retrieved. From operation 744, the process moves to operation 746, where the threshold is translated into a raw threshold value. From operation 746, the process moves to operation 748, where the raw threshold value and the configuration information is transmitted.

Figure 4:
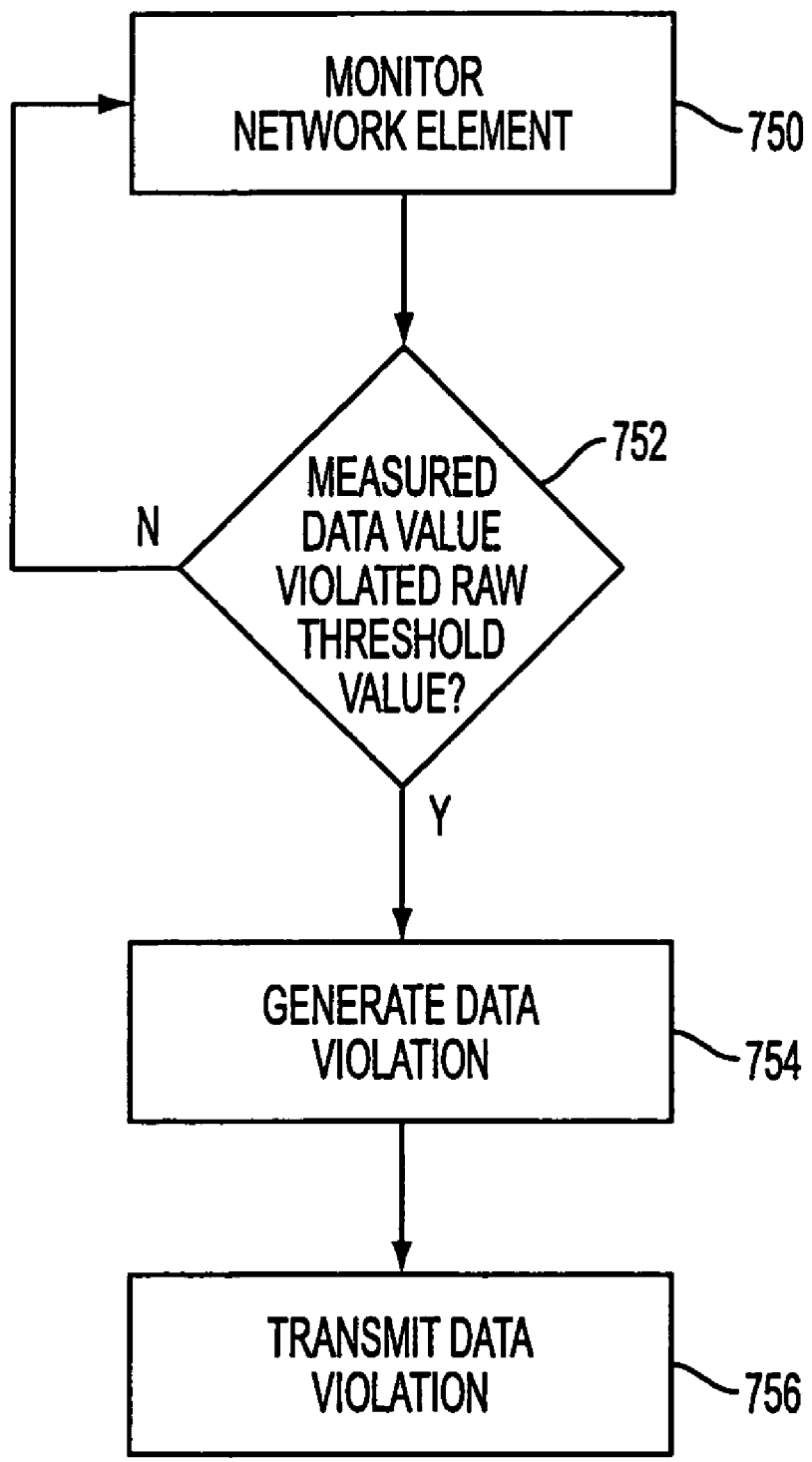
FIG. 4 is a flow diagram illustrating the generation of a data violation, according to embodiments of the present invention.

FIG. 4 is a flow diagram illustrating the generation of a data violation, according to embodiments of the present invention. Referring now to FIG. 4, in operation 750, the designated network element is monitored. From operation 750, the process moves to operation 752, where the measured data values are compared to the raw threshold value. From operation 752, if the raw threshold value is not violated, the process returns to operation 750. From operation 752, if the raw threshold value is violated, the process moves to operation 754, where a data violation is generated. From operation 754, the process moves to operation 756, where the data violation is transmitted.

Figure 5:
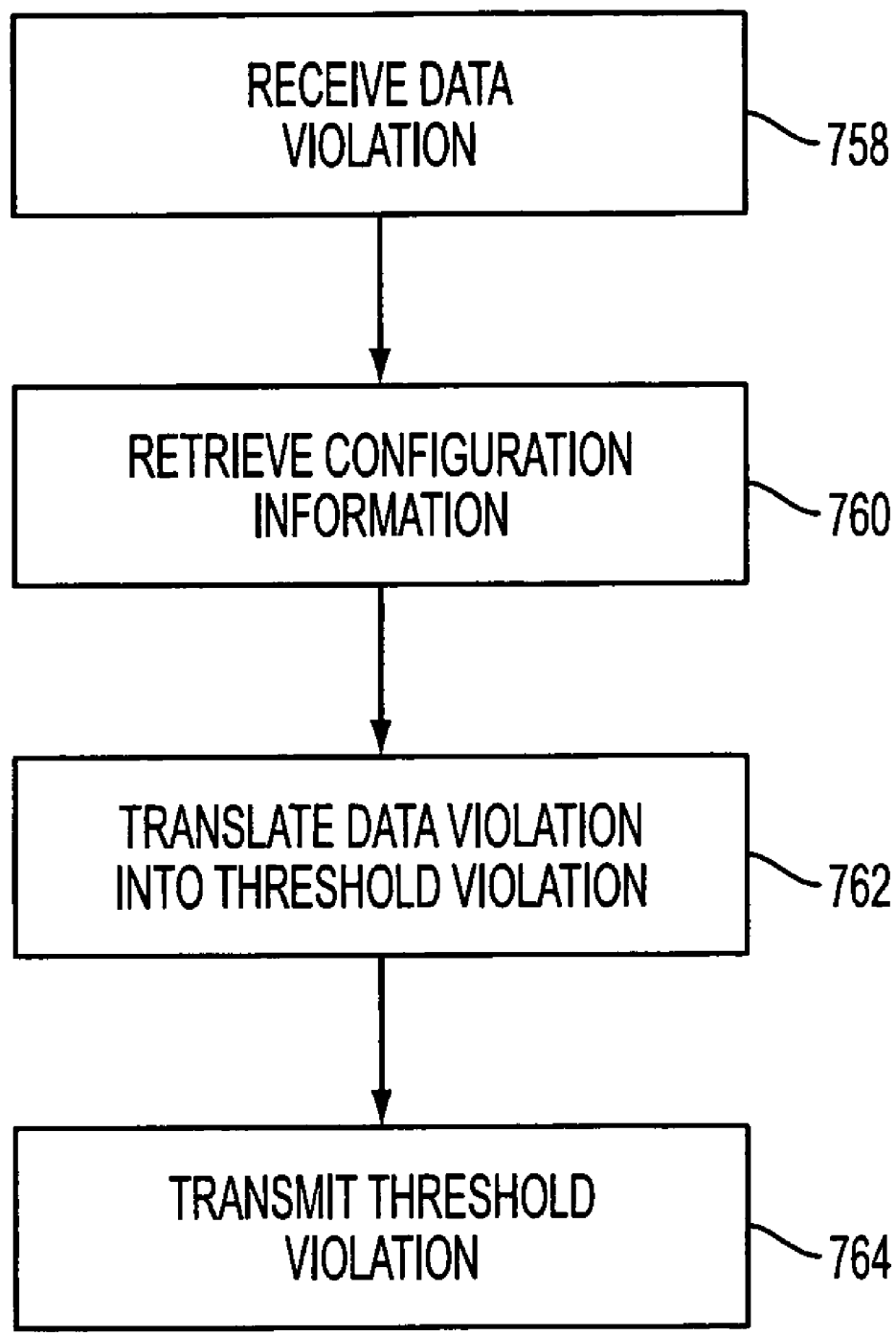
FIG. 5 is a flow diagram illustrating the translation of a data violation into a threshold violation, according to embodiments of the present invention.

FIG. 5 is a flow diagram illustrating the translation of a data violation into a threshold violation, according to embodiments of the present invention. Referring now to FIG. 5, in operation 758, the data violation is received. From operation 758, the process moves to operation 760, where the configuration information is retrieved. From operation 760, the process moves to operation 762, where the data violation is translated into a threshold violation. From operation 762, the process moves to operation 764, where the threshold violation is transmitted.

The network, network elements, absolute data monitors, threshold configurator, threshold translator, threshold translation engine, threshold event sender, raw data configurator, database, event system, and subscriber included in the system may include, for example, memories, processors, and/or Application Specific Integrated Circuits ("ASICs"). Such memory may include a machine-readable medium on which is stored a set of instructions (i.e., software) embodying any one, or all, of the methodologies described herein. Software can reside, completely or at least partially, within this memory and/or within the processor and/or ASICs. For the purposes of this specification, the term "machine-readable medium" shall be taken to include any mechanism that provides (i.e., stores and/or transmits) information in a form readable by a machine (e.g., a computer). For example, a machine-readable medium includes storage mediums such as read only memory ("ROM"), random access memory ("RAM"), magnetic disk storage media; optical storage media, flash memory devices, and includes transmission mediums such as electrical, optical, acoustical, or other form of propagated signals (e.g., carrier waves, infrared signals, digital signals, etc.), etc.

As indicated above, various processes are performed "automatically," which indicates that the operation is performed in an automated manner by a computer, and intervention by the network administrator is not required.

Reference to the embodiment discussed above in regard to a raw threshold value of 60 megabits per second and the embodiment discussed above in regard to a raw threshold value of 60 megabits per second for five seconds are not intended to limit the application of the present invention thereto. Such embodiments are only examples of the many embodiments of the present invention, and do not limit the present invention to any particular threshold or numerical value.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention claimed is:

1. A method comprising:
   automatically translating a threshold set by a person, for a network, into a plurality of different raw threshold values for different ones of a plurality of heterogeneous network elements by i) retrieving configuration information for the different ones of the heterogeneous network elements, and ii) using the configuration information and a plurality of different algorithms to translate the threshold into the raw threshold values;
   monitoring measured data values generated by the different ones of the plurality of heterogeneous network elements for data violations of respective ones of the different raw threshold values; and
   automatically translating one of the data violations into a threshold violation of a respective one of the heterogeneous network elements.

2. The method of claim 1, further comprising:
   automatically configuring an absolute data monitor to monitor the measured data values generated by at least one of the heterogeneous network elements.

3. The method of claim 1, further comprising:
   automatically distributing the threshold violation into which the one of the data violations was automatically translated.

4. The method of claim 3, wherein the distributing comprises:
   automatically publishing the threshold violation to a publish/subscribe system; and
   automatically making the published threshold violation available to a subscriber.

5. The method of claim 4, wherein the subscriber is an event viewer, an event policy system, a data collection system, or an external system.

6. A network comprising:
   a plurality of heterogeneous network elements connected to a network to generate measured data values;
   a database storing configuration information for the plurality of heterogeneous network elements; and
   a threshold translation engine
   translating a threshold set by a person, for the network, into a plurality of different raw threshold values for different ones of the plurality of heterogeneous network elements by i) retrieving configuration information for the different ones of the plurality of heterogeneous network elements, and ii) using the configuration information and a number of different algorithms to translate the threshold into the different raw threshold values; and
   when a data violation is generated in accordance with one of the raw threshold values being violated based on a monitored, measured data value generated by a respective heterogeneous network element of the plurality of heterogeneous network elements, translating the data violation into a threshold violation via an algorithm that translates the data violation into the threshold violation of said respective heterogeneous network element.

7. The network of claim 6, further comprising:
   a threshold configurator presenting a user interface for entering the threshold and selecting the different ones of the plurality of heterogeneous network elements.

8. The network of claim 6, further comprising:
   a plurality of absolute data monitors to monitor the plurality of heterogeneous network elements for measured data values and to generate the data violation.

9. The network of claim 8, further comprising:
   a raw data configurator to configure the plurality of absolute data monitors to monitor the plurality of heterogeneous network elements.

10. The network of claim 8, wherein one of the plurality of heterogeneous network elements comprises one of the plurality of absolute data monitors.

11. The network of claim 6, further comprising:
    a publish/subscribe system to publish the threshold violation into which the data violation was translated, and to make the published threshold violation available to a subscriber.

12. The network of claim 11, further comprising:
    a subscriber, wherein the subscriber is an event viewer, an event policy system, a data collection system, or an external system.

13. The network of claim 6, wherein the threshold translation engine comprises:
    a threshold translator to translate the threshold into the plurality of different raw threshold values and to translate the data violation into the threshold violation; and
    a threshold event sender to push out the threshold violation.

14. A machine-readable storage medium that provides instructions, which, when executed by a machine, cause the machine to perform operations comprising:
    automatically translating a threshold set by a person, for a network, into a plurality of different raw threshold values for different ones of a plurality of heterogeneous network elements by i) retrieving configuration information for the different ones of the heterogeneous network elements, and ii) using the configuration information and a plurality of different algorithms to translate the threshold into the raw threshold values; and
    when a data violation is generated in accordance with one of the raw threshold values being violated based on a monitored, measured data value generated by a respective heterogeneous network element of the plurality of heterogeneous network elements, automatically translating the data violation into a threshold violation via an algorithm that translates the data violation into the threshold violation of said respective heterogeneous network element.

15. The machine-readable storage medium of claim 14, wherein the machine-readable medium further provides instructions, which, when executed by a machine, cause the machine to perform operations comprising:

automatically configuring an absolute data monitor to monitor the measured data values generated by at least one of the heterogeneous network elements.

16. The machine-readable storage medium of claim 14, wherein the machine-readable medium further provides instructions, which, when executed by a machine, cause the machine to perform operations comprising:

automatically distributing the threshold violation into which the one of the data violations was automatically translated.

17. The machine-readable storage medium of claim 16, wherein automatically distributing comprises:

automatically publishing the threshold violation to a publish/subscribe system; and automatically making the published threshold violation available to a subscriber.

18. The machine-readable storage medium of claim 17, wherein the subscriber is an event viewer, an event policy system, a data collection system, or an external system.

19. A network, comprising:

a network element database to store threshold configuration information about a plurality of heterogeneous network elements;

a threshold translator to i) translate a threshold set by a person, for the network, into a plurality of different raw threshold values for different ones of the plurality of heterogeneous network elements, via algorithms that translate the threshold into the raw threshold values and to ii) translate data violations into threshold violations in accordance with algorithms that translate the data violations into the threshold violations;

a plurality of absolute data monitors to monitor the plurality of heterogeneous network elements for heterogeneous measured data values and to generate the data violations based on the measured data values when one of the monitored measured data values violates one of the raw threshold values;

a threshold event sender to push out the threshold violations into which data violations have been translated;

an event system to publish the threshold violations into which data violations have been translated; and a plurality of subscribers to access the published threshold violations.

20. The network of claim 19, further comprising a raw data configurator to configure the plurality of absolute data monitors to monitor the plurality of heterogeneous network elements.

21. An apparatus for generating a threshold violation, comprising:

a database storing configuration information of a plurality of heterogeneous network elements connected to a network;

means for automatically translating a threshold set by a person, for the network, into a plurality of raw threshold values for different ones of a plurality of heterogeneous network elements by i) retrieving, from the database, configuration information for the different ones of the heterogeneous network elements, and ii) using the configuration information and a plurality of different algorithms to translate the threshold into the raw threshold values; and means for, when a data violation is generated in accordance with one of the raw threshold values being violated based on a monitored, measured data value generated by a respective heterogeneous network element of the plurality of heterogeneous network elements, automatically translating the data violation into a threshold violation via an algorithm that translates the data violation into the threshold violation of said respective heterogeneous network element.

* * * * *